Aug. 23, 1932.　　　　V. M. GRAHAM　　　1,873,704
VARIABLE CAPACITOR TEST
Filed Dec. 10, 1928

INVENTOR
VIRGIL M. GRAHAM
BY D. Clyde Jones
ATTORNEY

Patented Aug. 23, 1932

1,873,704

UNITED STATES PATENT OFFICE

VIRGIL M. GRAHAM, OF ROCHESTER, NEW YORK, ASSIGNOR TO THE STROMBERG-CARLSON TELEPHONE MANUFACTURING COMPANY, OF ROCHESTER, NEW YORK, A CORPORATION OF NEW YORK

VARIABLE CAPACITOR TEST

Application filed December 10, 1928. Serial No. 325,088.

This invention relates to apparatus and methods for testing multi-unit condensers.

In the use of multi-unit capacitors now commonly known in the art as "gang condensers" it is necessary that there should be only infinitesimal variations in capacitance between the various units. This is especially true where the multi-unit capacitor is utilized in the radio frequency stages of a single-selector radio receiver. In order to determine which multi-unit capacitors are sufficiently uniform for use it is necessary to have certain methods for testing which indicate whether there is variation from the desired uniformity. Since many such capacitors are used, it is imperative that the method of testing should be rapid and since it is desirable to employ an arrangement which can be manipulated by an inexperienced operator, the method should be simple and in addition variations in temperature and humidity or current supply should not cause a variation in the efficiency of the testing equipment.

In accordance with the present invention a simple method of testing variable multi-unit capacitors has been devised and apparatus has been designed for effecting the various stages of the method.

In its simpler aspects the method consists in employing two sources of radio frequency oscillations so connected in a testing network that they may generate various frequencies. The units of a multi-unit capacitor are successively connected into the network including the two sources of frequency and the angular engagement of the capacitor plates of the first unit in their minimum, intermediate and maximum positions is compared with similar positions of engagement of the second, third, fourth, etc. units. A separate adjustable vernier condenser having a dial, indicating the various degrees of variation, is connected in the network so that the capacitance of the vernier condenser or capacitor combined with the capacitance of the unit being compared with the first capacitor, will cause a zero beat in a head set connected into the network.

Figure 1:
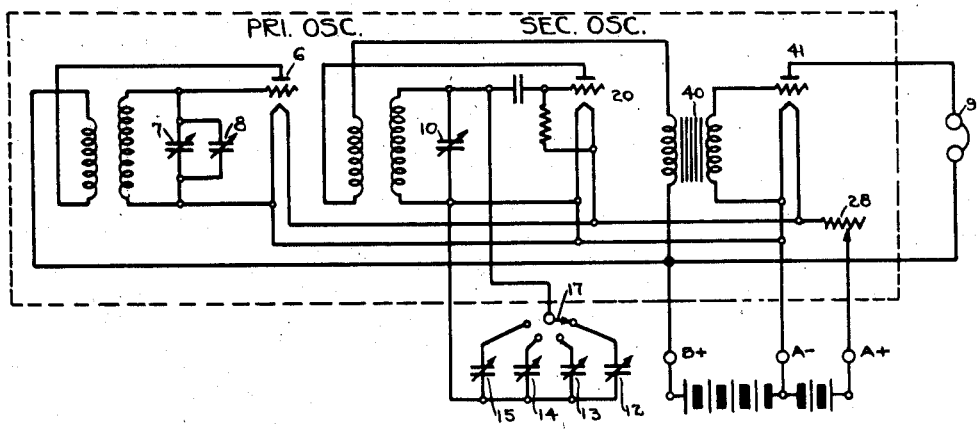
Figure 2:
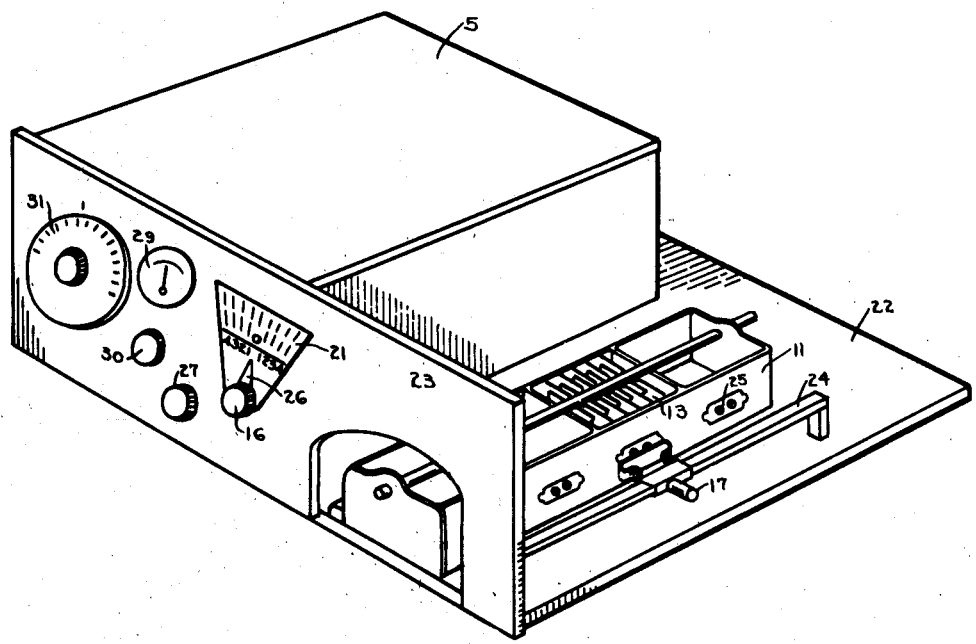

For a better understanding of the invention reference is made to Fig. 1 in which there is represented a diagrammatic showing of the testing network and apparatus utilized in effecting the test. Fig. 2 is a perspective view of one form of the apparatus which includes the network of Fig. 1, the electrical circuits of which are concealed by the housing.

Referring especially to Fig. 1 the equipment enclosed within the broken line is enclosed within the housing, generally designated 5 in Fig. 2. This network includes a primary oscillator designated Pri Osc and a secondary oscillator designated Sec Osc. The primary oscillator includes a vacuum tube 6 having its output circuit coupled to the input circuit in such a manner that these circuits interact, the frequency of oscillation of this oscillator being determined by a variable condenser 7 and a vernier condenser 8, both of said condensers being adjustable.

The secondary oscillator Sec Osc likewise includes a vacuum tube 20 having its output circuit coupled to its input circuit so that these circuits interact in the well-known manner to generate oscillations. The frequency of these oscillations generated by the secondary oscillator may be determined in part by tuning the variable vernier condenser 10. The output circuit of this secondary oscillator is connected to amplifier 41 through transformer 40 and since there is incidental coupling between the primary oscillator and the secondary oscillator, a beat frequency is developed in the pair of head phones 9 when there is any variation between these frequencies or a "zero beat" is developed when the two frequencies are the same.

In the use of the testing equipment it has been found desirable to have the frequencies of the primary oscillator three-fifths of that of the secondary oscillator at corresponding positions of the tuning condensers so that a zero beat can be obtained between the third harmonic of the primary oscillator and the fifth harmonic of the other. This prevents the "pulling in" effect on the oscillators, that is, if the frequencies generated by the oscillator are quite similar there is a tendency for the oscillators to get into step with each other and if even harmonics are employed the opportunity for such a condition taking place is greatly increased, however, applicant does not desire to be limited to the use of the third and fifth harmonics.

Fig. 2 shows the mechanical equipment of the testing layout which includes a base 22 on which there is mounted a panel 23 serving to support the controls and dial equipment. The circuit network represented within the broken line of Fig. 1 is enclosed within a housing 5 which engages the base 22 and a portion of the panel 23. At the right of this figure is represented a multi-unit capacitor 11 supported on the base 22. Suitable clamps (not shown) firmly hold the capacitor in the position shown. Adjacent the capacitor there is mounted a horizontal conducting strip 24 on which the slider switch 17 is mounted to engage successively the screws 25 which are conductively connected to the stator element of its respective unit. Near the middle of the panel there is shown a scale 21 indicating plus or minus readings by movement of the pointer 26 carried by the handle or knob 16 of the vernier condenser 10. The knob 27 is the control element of the rheostat 28 of Fig. 1 and serves to control the filament current which is indicated on a suitable meter 29 mounted on the panel. The knob 30 is mounted on the handle or shaft of the vernier condenser 8 while the dial 31 is mounted on the rotor shaft of the condenser 7.

In performing the test, a multi-unit capacitor generally designated 11 consisting of the units 12, 13, 14 and 15 is placed in a fixture (not shown) on the base 22 so that the slider 17 may engage the screws 25 of the various units to connect the various units successively in multiple with the variable condenser 10. The rotor of the multi-unit capacitor is rotated so that there is minimum capacitance, and the first unit such as 12 is connected by means of the slider 17 in the network of the second oscillator. The knob 16 is then moved so that the indicator 26 points to zero and the condensers 7 and 8 of the primary oscillator are adjusted until a "zero beat" is heard in the head phones 9. This shows that the capacitance of the condensers 7 and 8 bears a certain ratio to the minimum capacitances of the unit 12. The slider 17 is then moved to its second position to connect the unit 13 with the network and the knob 16 is turned to adjust the vernier condenser 10 until a "zero beat" is detected in the head phones. Since the capacitance of the condensers 7 and 8 has been adjusted to a certain ratio of the minimum capacitance of the unit 12 and since the unit 13 is now being compared with the capacitance of the condensers 7 and 8, the reading on the dial 21 indicates the variation from the minimum capacitance of the unit 12. If the variation indicated by the reading is within tolerable limits, the slider is then moved to connect the unit 14 in the network and the knob 16 again moved to adjust the vernier 10 until the "zero beat" is again detected. The reading on the scale 21 shows if the variation in the third unit from this first unit with which it is being compared is within tolerable limits. The slider is then successively moved to the fourth and fifth units if they are being tested and the reading on the scale 21 indicates whether their variation is within acceptable limits. The rotors of the multi-unit capacitors are then moved to an intermediate position such as 90 degrees and the slider is moved to connect in the unit 12 after which the condensers 7 and 8 are adjusted to cause a "zero beat" in the head phones. The position of the pointer 26 on the scale 21 indicates whether the variation is within accepted limits. The slider 17 is then successively moved to connect units 14 and 15 into the network, in each position the vernier being adjusted to give "zero beat" indication in the head phones and the readings on the scale 21 being noted to determine the degree of variation. When all of the units have been tested with their rotors in their intermediate position, the rotor shaft of the multi-unit capacitor is moved to the position of maximum capacitance, slider 17 is positioned to connect the unit 12 to the network and the condensers 7 and 8 are thereupon adjusted to produce "zero beat" indication in the head phones when the pointer 28 is in its zero position. The slider 17 and the knob 16 are adjusted to test the several units successively in the manner indicated with the zero and minimum positions of capacitors.

From the foregoing it will be seen that the units 13, 14 and 15 are tested for minimum, intermediate, and maximum capacitance with respect to unit 12, that is, the test is designed to show the variation of capacitance of the units of the capacitor with respect to the first unit taken as a standard. It will be understood that if a more exact test of the units is desired than three test positions of minimum, intermediate, and maximum capacitance, more testing positions of the units may be utilized. In this arrangement even a slow variation in the oscillators due to battery voltage change, while not desirable, would not be particularly serious as the primary oscillator vernier 8 is adjusted with every multi-unit capacitor. This means that the references are being constantly checked and as long as there are no momentary changes the test equipment cannot give trouble from poor adjustment. Furthermore the routine adjustments and readings are so simple that an unskilled operator can quickly determine which capacitor units are acceptable for use.

What I claim is:

1. The method of testing the uniformity in capacitance between the units of a multi-unit capacitor which consists in comparing the capacitance of one unit in each of several positions with each of the remaining units in their corresponding positions, employing a compensating capacitance with the units being compared to cause the joint capacitances to equal the capacitance of said first unit, employing interacting frequencies to show said equality, and indicating the amount of compensating capacitance.

2. The method of testing the variation in capacitance between the several units of a multi-unit capacitor which consists in developing and causing to interact two different frequencies of oscillations such that an odd harmonic of one frequency and a different odd harmonic of other said frequency produces zero beat, the period of the first frequency being determined by the capacitance of one of said units of said multi-unit capacitor in one of its testing positions and the period of said second frequency being determined by a variable capacitance associated therewith, substituting a second unit of said multi-unit capacitor for said first unit in a corresponding testing position, associating a compensating capacitance with said second unit so that the period of its associated frequency is such that the interaction of said frequencies develop zero beat, and indicating the amount of said compensating capacitance.

3. In a device for testing uniformity between the various units of a multi-unit capacitor which includes a primary oscillator of the electron discharge device type provided with an interacting output circuit and an input circuit, said input circuit being tuned by means including a variable capacitor and a vernier capacitor, a second oscillator of the electron discharge device type arranged to interact with said primary oscillator to produce a resulting audible frequency, said second oscillator being provided with interacting output and input circuits, said last mentioned input circuit being tuned by means including a variable capacitor, means including a sliding switch for successively connecting the units of a multi-unit capacitor in multiple with said last mentioned capacitor, and means including a sound reproducing device linked to said oscillators to reproduce said audible frequency.

4. In a device for indicating the variation between the units of a multi-unit capacitor which includes a primary oscillator having an electron discharge device, a second oscillator including an electron discharge device, said oscillators being coupled together and tuned so that an odd harmonic of one oscillator interacts with a different odd harmonic of said second oscillator, means for tuning said first oscillator to said predetermined odd harmonic frequency, and means including a variable capacitor and a unit of said multi-unit capacitor for tuning said second oscillator to said different odd harmonic frequency, switching means for substituting one unit of the multi-unit capacitor for another unit, and a sound reproducing device linked to said oscillators for audibly reproducing the resulting frequency from the interaction of said odd harmonic frequencies.

5. The method of testing the variation in capacitance between the several units of a multi-unit capacitor which consists in the operation of adjusting the value of a standard capacitance for each capacitor tested to have a certain ratio to the capacitance of one of said units, comparing another unit of said multi-unit capacitor with said standard capacitance, measuring the amount of variation of said second unit from said standard ratio, and in repeating the operations in another position of adjustment of said other unit.

In witness whereof, I hereunto subscribe my name this 15th day of November, A. D. 1928.

VIRGIL M. GRAHAM.